United States Patent
Choi et al.

(10) Patent No.: US 11,960,019 B2
(45) Date of Patent: Apr. 16, 2024

(54) TECHNIQUES FOR RANGING AND POSITIONING OF DISTRIBUTED DEVICES

(71) Applicant: QUALCOMM Incorporated, San Diego, CA (US)

(72) Inventors: Chang-Sik Choi, Seoul (KR); Kapil Gulati, Belle Mead, NJ (US); Gene Wesley Marsh, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 17/447,752

(22) Filed: Sep. 15, 2021

(65) Prior Publication Data

US 2022/0099786 A1 Mar. 31, 2022

Related U.S. Application Data

(60) Provisional application No. 63/198,042, filed on Sep. 25, 2020.

(51) Int. Cl.
| | |
|---|---|
| *G01S 5/02* | (2010.01) |
| *H04L 5/00* | (2006.01) |
| *H04W 64/00* | (2009.01) |
| *H04W 72/30* | (2023.01) |

(52) U.S. Cl.
CPC .......... *G01S 5/0289* (2013.01); *H04L 5/0048* (2013.01); *H04W 64/003* (2013.01); *H04W 72/30* (2023.01)

(58) Field of Classification Search
CPC ..... G01S 5/0289; G01S 1/042; H04L 5/0048; H04W 64/003; H04W 72/30; H04W 4/02
See application file for complete search history.

(56) References Cited

U.S. PATENT DOCUMENTS

| | | | |
|---|---|---|---|
| 2018/0180703 A1* | 6/2018 | Kim | .......................... G01S 5/10 |
| 2019/0182794 A1* | 6/2019 | Wong | ................ H04W 52/0216 |
| 2019/0208387 A1 | 7/2019 | Jiang et al. | |
| 2020/0128506 A1 | 4/2020 | Zhang et al. | |
| 2021/0072340 A1* | 3/2021 | Wang | ..................... H04L 5/0051 |
| 2022/0095278 A1* | 3/2022 | Kim | .......................... H04L 5/00 |
| 2023/0221397 A1* | 7/2023 | Baek | ....................... H04L 5/005 |
| | | | 455/456.1 |

OTHER PUBLICATIONS

International Search Report and Written Opinion—PCT/US2021/071483—ISA/EPO—dated Feb. 24, 2022.

\* cited by examiner

*Primary Examiner* — Kabir A Timory
(74) *Attorney, Agent, or Firm* — Harrity & Harrity, LLP

(57) ABSTRACT

Various aspects of the present disclosure generally relate to wireless communication. In some aspects, a first user equipment (UE) may identify a plurality of UEs for a UE positioning session. The UE may identify a set of parameters for the UE positioning session. The UE may broadcast information indicating at least the set of parameters for the UE positioning session. The UE may receive, from at least one of the plurality of UEs, a set of positioning reference signals (PRSs) based at least in part on the set of parameters. The UE may broadcast, based at least in part on the set of PRSs, positioning information. Numerous other aspects are provided.

25 Claims, 8 Drawing Sheets

TECHNIQUES FOR RANGING AND POSITIONING OF DISTRIBUTED DEVICES

CROSS-REFERENCE TO RELATED APPLICATION

This Patent Applications claims priority to U.S. Provisional Patent Application No. 63/198,042, filed on Sep. 25, 2020, entitled "TECHNIQUES FOR RANGING AND POSITIONING OF DISTRIBUTED DEVICES," and assigned to the assignee hereof. The disclosure of the prior Applications is considered part of and is incorporated by reference into this Patent Applications

FIELD OF THE DISCLOSURE

Aspects of the present disclosure generally relate to wireless communication and to techniques and apparatuses for ranging and positioning of distributed devices.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes identifying a plurality of UEs for a UE positioning session; identifying a set of parameters for the UE positioning session; broadcasting information indicating at least the set of parameters for the UE positioning session; receiving, from at least one of the plurality of UEs, a set of positioning reference signals (PRSs) based at least in part on the set of parameters; and broadcasting, based at least in part on the set of PRSs, positioning information.

In some aspects, a method of wireless communication performed by a first UE includes receiving, from a UE, broadcasted information indicating a set of parameters for a UE positioning session; broadcasting a first set of PRSs based at least in part on the set of parameters; receiving a second set of PRSs based at least in part on the set of parameters; and broadcasting positioning information, based at least in part on at least one of the first set of PRSs or the second set of PRSs.

In some aspects, a first UE for wireless communication includes a memory; and one or more processors coupled to the memory, the one or more processors configured to: identify a plurality of UEs for a UE positioning session; and identify a set of parameters for the UE positioning session. The first UE may include a transceiver configured to broadcast information indicating at least the set of parameters for the UE positioning session; receive, from at least one of the plurality of UEs, a set of PRSs based at least in part on the set of parameters; and broadcast, based at least in part on the set of PRSs, positioning information.

In some aspects, a UE for wireless communication includes a memory; one or more processors coupled to the memory; and a transceiver configured to receive, from a UE, broadcasted information indicating a set of parameters for a UE positioning session; broadcast a first set of PRSs based at least in part on the set of parameters; receive a second set of PRSs based at least in part on the set of parameters; and broadcasting positioning information, based at least in part on at least one of the first set of PRSs or the second set of PRSs.

In some aspects, a non-transitory computer-readable medium storing a set of instructions for wireless communication includes one or more instructions that, when executed by one or more processors of a first UE, cause the first UE to: identify a plurality of UEs for a UE positioning session; identify a set of parameters for the UE positioning session; broadcast information indicating at least the set of parameters for the UE positioning session; receive, from at least one of the plurality of UEs, a set of PRSs based at least in part on the set of parameters; and broadcast, based at least in part on the set of PRSs, positioning information.

In some aspects, a non-transitory computer-readable medium storing a set of instructions for wireless communication includes one or more instructions that, when executed by one or more processors of a first UE, cause the first UE to: receive, from a UE, broadcasted information indicating a set of parameters for a UE positioning session; broadcast a first set of PRSs based at least in part on the set of parameters; receive a second set of PRSs based at least in part on the set of parameters; and broadcasting positioning information, based at least in part on at least one of the first set of PRSs or the second set of PRSs.

In some aspects, an apparatus for wireless communication includes means for identifying a plurality of UEs for a UE positioning session; means for identifying a set of parameters for the UE positioning session; broadcasting information indicating at least the set of parameters for the UE positioning session; means for receiving, from at least one of the plurality of UEs, a set of PRSs based at least in part on the set of parameters; and means for broadcasting, based at least in part on the set of PRSs, positioning information.

In some aspects, an apparatus for wireless communication includes means for receiving, from a UE, broadcasted information indicating a set of parameters for a UE positioning session; means for broadcasting a first set of PRSs based at least in part on the set of parameters; means for receiving a second set of PRSs based at least in part on the set of parameters; and broadcasting positioning information, based at least in part on at least one of the first set of PRSs or the second set of PRSs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
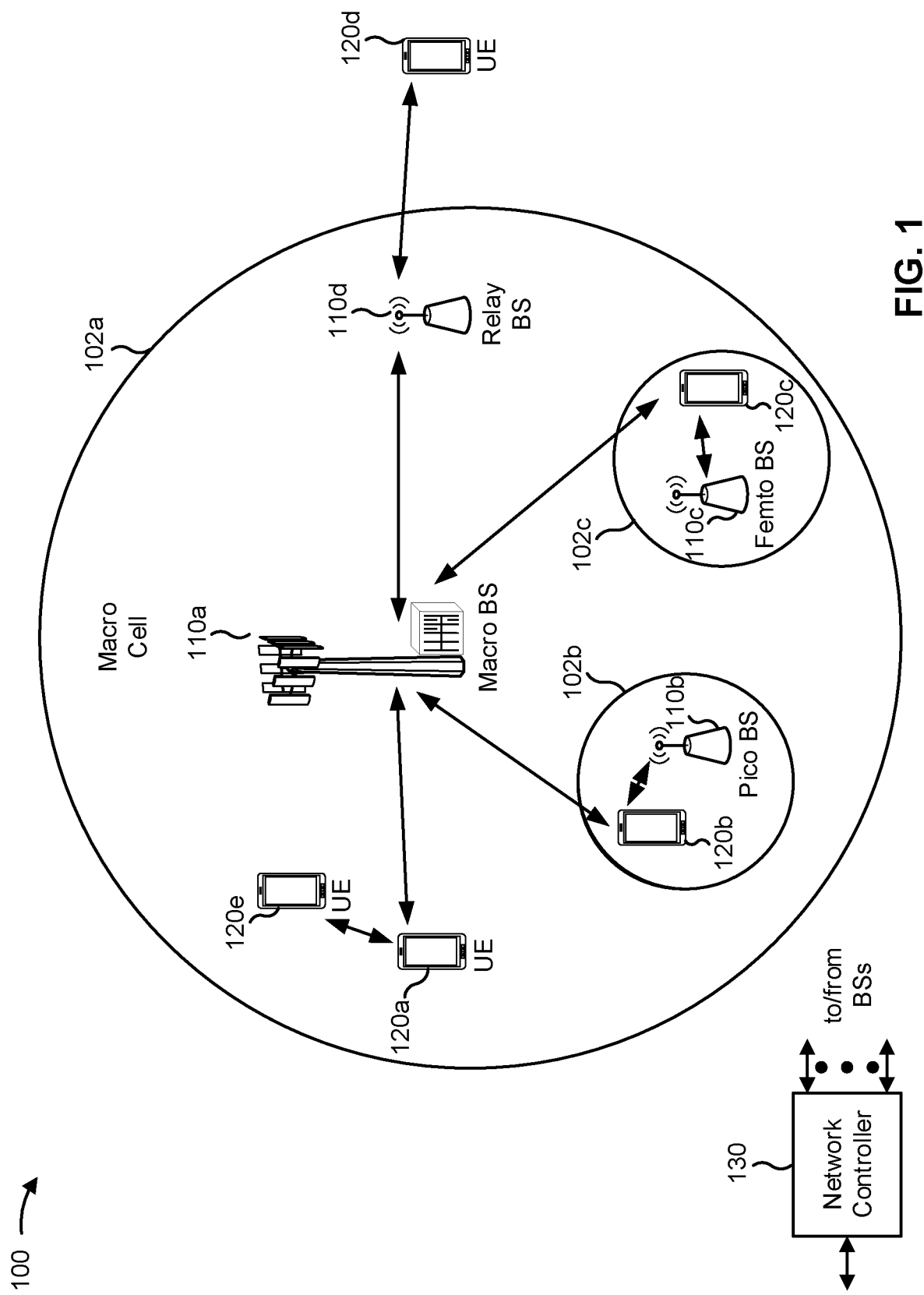
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or a Long Term Evolution (LTE) network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
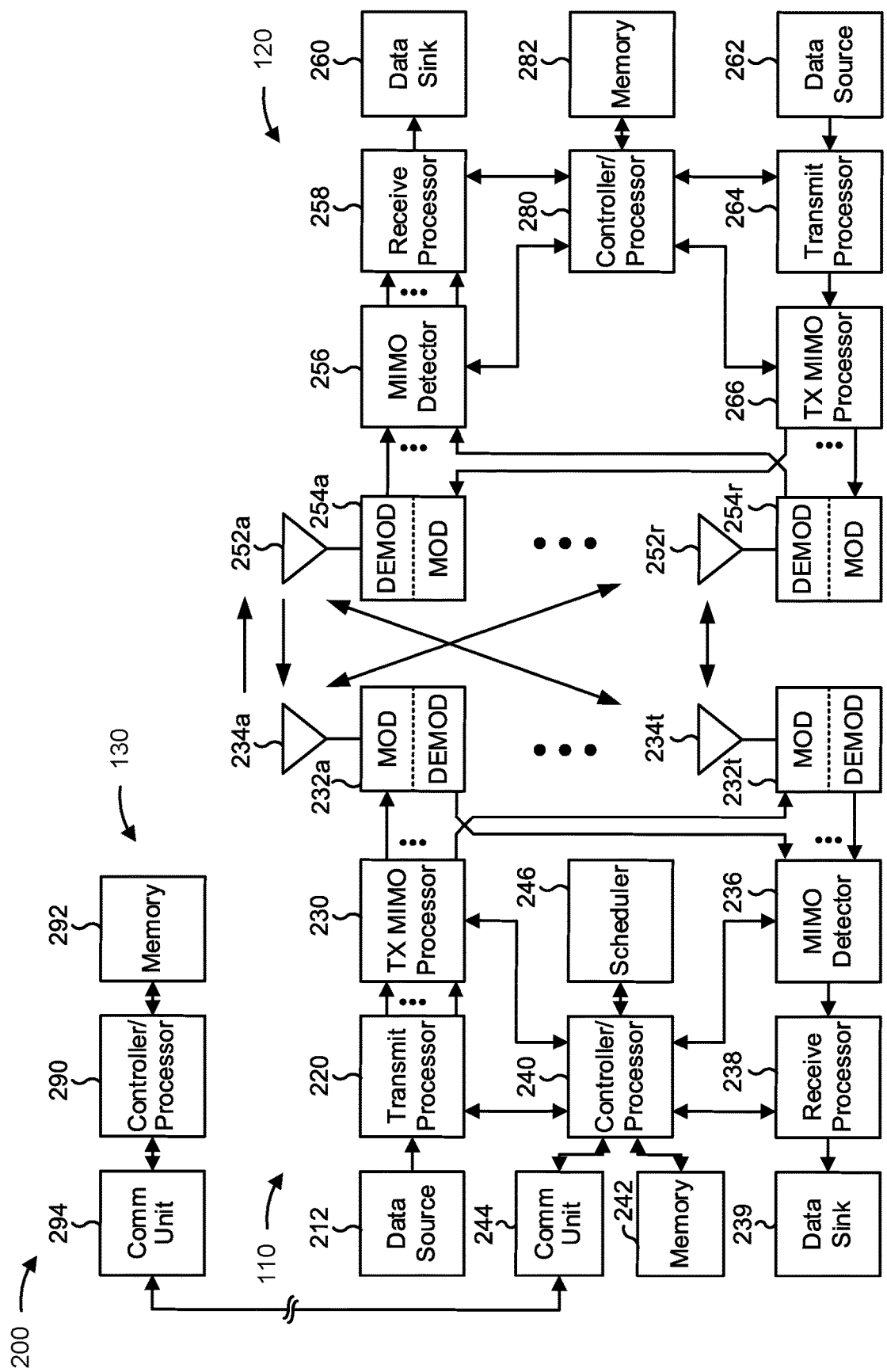
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7).

Controller/processor 240 of base station 110, controller/processor 280 of UE 120, and/or any other component(s) of FIG. 2 may perform one or more techniques associated with techniques for ranging and positioning of distributed devices, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a UE (e.g., UE 120) includes means for identifying a plurality of UEs for a UE positioning session; means for identifying a set of parameters for the UE positioning session; means for broadcasting information indicating at least the set of parameters for the UE positioning session; means for receiving, from at least one of the plurality of UEs, a set of PRSs based at least in part on the set of parameters; and/or means for broadcasting, based at least in part on the set of PRSs, positioning information. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for receiving, from a UE, broadcasted information indicating a set of parameters for a UE positioning session; means for broadcasting a first set of PRSs based at least in part on the set of parameters; means for receiving a second set of PRSs based at least in part on the set of parameters; and/or broadcasting positioning information, based at least in part on at least one of the first set of PRSs or the second set of PRSs. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A wireless communication system may determine positioning of wireless communication devices based at least in part on a positioning reference signal (PRS). For example, UEs may perform a UE positioning session to determine locations of the UEs relative to one another. In some aspects, a PRS may be a signal that is generated based at least in part on a pseudo-noise (PN) sequence, such as a quadrature phase shift keying (QPSK) modulated random sequence. Some PRSs may use a large bandwidth in order to improve ranging.

A UE positioning session may include a pre-PRS stage, a PRS stage, and a post-PRS stage. The pre-PRS stage may involve the transmission of information regarding the UE positioning session. The PRS stage may involve the transmission of PRSs by UEs to facilitate the UE positioning session. The post-PRS stage may involve the determination of measurements based at least in part on the PRSs, the determination of positioning information based at least in part on the measurements, and the transmission of the positioning information. A UE performing a UE positioning session may determine a location of the UE based at least in part on a known location of another UE, which may be determined based at least in part on the positioning information. For example, the other UE may transmit positioning information indicating the location of the other UE so that the UE can determine an absolute range relative to the location of the other UE (referred to as an anchor). In some aspects, ranging may be based at least in part on a difference in a transmission time of a PRS and an arrival time of the PRS.

A UE positioning session may be performed in a pair-wise fashion. For example, a first UE and a second UE may perform the pre-PRS stage, the PRS stage, and the post-PRS stage with each other by signaling the relevant information between each other. If a UE is to perform UE positioning sessions with multiple UEs, such as to triangulate a position of the UE or one or more other UEs, the UE may perform pair-wise operations with each UE of the multiple UEs. However, performing the UE positioning session in a pair-wise fashion may involve significant overhead, which may increase power consumption and communication resource usage of UEs performing the UE positioning session.

Some techniques and apparatuses described herein provide for a UE to perform a UE positioning session with a group of UEs. For example, a first UE may select a group of UEs for a UE positioning session. In some aspects, the group of UEs may include multiple UEs. For example, the first UE may select the group of UEs based at least in part on basic safety messages (BSMs) transmitted by the group of UEs. The first UE may determine parameters for the UE positioning session and may broadcast the parameters to the group of UEs. The first UE and at least one UE of the group of UEs may broadcast PRSs and may broadcast positioning information based at least in part on the PRSs. In some aspects, the UE may configure the other UEs to transmit multiple PRSs in association with a single pre-PRS stage and/or a single post-PRS stage. In some aspects, the UE may configure one or more UEs of the group of UEs to transmit PRSs, and one or more other UEs of the group of UEs to determine and/or broadcast positioning information based at least in part on the PRSs. In this way, overhead is reduced relative to performing pair-wise UE positioning sessions, which reduces power consumption and communication resource usage of the UEs performing the UE positioning sessions.

Figure 3:
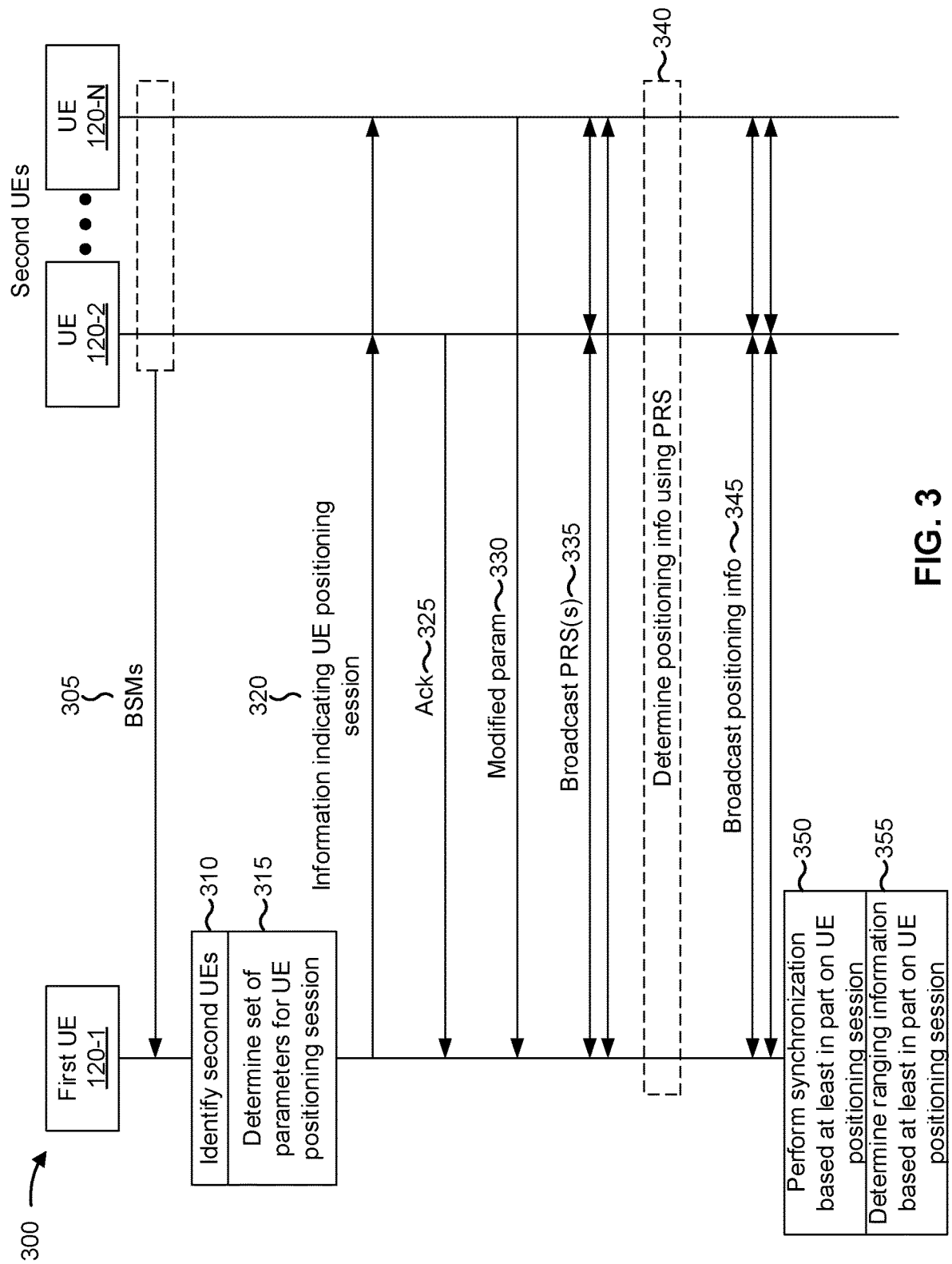
FIG. 3 is a diagram illustrating an example of a UE positioning session for a group of UEs, in accordance with the present disclosure.

FIG. 3 is a diagram illustrating an example 300 of a UE positioning session for a group of UEs, in accordance with the present disclosure. As shown, example 300 includes a first UE 120-1 and a plurality of second UEs 120-2 through 120-N. The first UE 120-1 is referred to herein as a first UE, and the plurality of second UEs 120-2 through 120-N are referred to herein as a plurality of second UEs. In some aspects, the communications between UEs of FIG. 3 may be performed via a sidelink interface, such as a ProSe Sidelink (PC5) interface or a similar interface.

As shown by reference number 305, the first UE may receive BSMs from the plurality of second UEs. For example, the plurality of second UEs may transmit BSMs. A BSM may be a communication that indicates information regarding a UE's position, location, heading, speed, acceleration, and/or other information indicating a UE's state and/or predicted path. In some aspects, a BSM may carry information regarding a vehicle associated with a UE. In some aspects, a UE may transmit BSMs periodically. In some aspects, the first UE may receive a different signal than a BSM from a second UE. In other words, the techniques and apparatuses described herein are not limited to identifying the second UEs based at least in part on BSMs transmitted by the second UEs.

As shown by reference number 310, the first UE may identify the plurality of second UEs based at least in part on the BSMs. For example, the first UE may select the plurality of second UEs for the UE positioning session. In some aspects, the first UE may identify the plurality of second UEs based at least in part on a measurement associated with a BSM, location information indicated by a BSM (e.g., an estimated distance between the first UE and a second UE), or another criterion. In some aspects, the first UE may select all UEs of the plurality of second UEs for transmission of PRSs. In some aspects, the UE 120 may select a subset of UEs of the plurality of second UEs for transmission of PRSs. Other UEs of the plurality of second UEs may determine positioning information based at least in part on the PRSs. In some aspects, the first UE may identify one or more second UEs to transmit PRSs, and may not explicitly identify UEs to determine positioning information based at least in part on the PRSs. For example, a UE to determine positioning information may receive a broadcasted pre-PRS message indicating a set of parameters for the PRSs (e.g., without having been identified by the first UE), and may determine positioning information based at least in part on the set of parameters and the PRSs.

As shown by reference number 315, the first UE may determine a set of parameters for the UE positioning session. In some aspects, the first UE may determine a time associated with broadcasting a PRS (e.g., a PRS broadcast time). For example, the first UE may determine a time for the first UE to broadcast a PRS. As another example, the first UE may determine a time for a second UE to broadcast a PRS. If a UE (e.g., the first UE or a second UE) is to transmit multiple PRSs, then the first UE or the second UE may determine times for each of the multiple PRSs.

In some aspects, the first UE may determine a sequence for a PRS. For example, the first UE may determine a root sequence, a cyclic shift, an initialization, or another parameter relating to a sequence, for generation of a PRS to be transmitted by the first UE. As another example, the first UE may determine a root sequence, a cyclic shift, an initialization, or another parameter relating to a sequence, for generation of a PRS to be transmitted by a second UE. If a UE (e.g., the first UE or a second UE) is to transmit multiple PRSs, then the first UE or the second UE may determine sequences for each of the multiple PRSs.

In some aspects, the first UE may determine a number of UE positioning sessions to perform. For example, the first UE may determine a number of pre-PRS messages to transmit, a number of PRSs to transmit, and/or a number of positioning information messages to transmit. As another example, the first UE may determine a number of times to perform the operations shown by reference numbers 320-345. Thus, the UE may perform multiple iterations of the UE positioning sessions based at least in part on identifying a plurality of second UEs, which reduces overhead relative to performing the UE positioning session in a pair-wise fashion or initiating separate UE positioning sessions for each iteration. In some aspects, the number of UE positioning sessions to perform may be based at least in part on a length of time. For example, the first UE may determine a length of time for which to perform UE positioning sessions and may determine the number of UE positioning sessions based at least in part on the length of time and a length of a UE positioning session.

In some aspects, the first UE may determine an order associated with the UE positioning session. For example, the first UE may determine an order in which the first UE and/or the plurality of second UEs are to broadcast PRSs and/or positioning information associated with the PRSs. In some aspects, the first UE may determine an order for the first UE (e.g., a position of the first UE in the order) and one or more second UEs may determine an order for the one or more second UEs.

In some aspects, the first UE may determine a number of PRSs to be broadcasted by the first UE or the plurality of second UEs. For example, the first UE may determine that the first UE and the plurality of second UEs are each to broadcast a single PRS. As another example, the first UE may determine that the first UE and the plurality of second UEs are each to broadcast multiple PRSs. Approaches for broadcasting multiple PRSs are described in more detail in connection with FIGS. 4 and 5.

As shown by reference number 320, the first UE may broadcast information indicating at least the set of parameters for the UE positioning session. The information indicating at least the set of parameters for the UE positioning session is referred to herein as a pre-PRS message. As further shown, the plurality of second UEs may receive the pre-PRS message. The pre-PRS message may indicate information regarding the UE positioning session, such as any one or more of the parameters determined in connection with reference number 315. In some aspects, the pre-PRS message may indicate that the plurality of second UEs are to perform the UE positioning session, and the plurality of second UEs may determine parameters for the UE positioning session based at least in part on receiving the pre-PRS message. For example, one or more second UEs may transmit a PRS based at least in part on the pre-PRS message. As another example, one or more second UEs may determine positioning information based at least in part on the pre-PRS message and the PRSs transmitted by other second UEs of the plurality of second UEs. For example, the set of parameters may be usable, by a UE, to determine positioning information associated with the UE based at least in part on the PRSs. By broadcasting the pre-PRS message, the first UE may conserve power and communication resources that would otherwise be used to unicast or transmit pre-PRS messages to each second UE of the plurality of second UEs.

As shown by reference number 325, in some aspects, a second UE may transmit (e.g., broadcast) an acknowledgment of a pre-PRS message. For example, the second UE may transmit information indicating whether the pre-PRS message transmitted by the first UE (or another second UE) was successfully received by the second UE. As shown by reference number 330, in some aspects, a second UE may transmit (e.g., broadcast) information indicating a modified parameter for the UE positioning session. For example, the second UE may determine a modified parameter, and may transmit a message indicating the modified parameter to the first UE. In some aspects, the modified parameter may indicate a time associated with a PRS, a sequence for a PRS, and/or the like. In some aspects, the modified parameter may be a proposed parameter, which the first UE may determine to use or not to use. In some aspects, the second UE may transmit an indication of a set of parameters for the UE positioning session, such as a set of parameters determined by the second UE (e.g., based at least in part on a parameter signaled by the first UE or independently of signaling from the first UE).

The messages shown by reference numbers 320, 325, and 330 may be referred to as pre-PRS messages. Furthermore, one or more of the operations of example 300 shown by reference numbers 305, 310, 315, 320, 325, and 330 may be referred to as the pre-PRS stage of the UE positioning session. By identifying the plurality of second UEs and broadcasting the pre-PRS message shown by reference number 320, the first UE may conserve power and communication resources that would otherwise be used to perform UE positioning sessions individually with each second UE. In some aspects, one or more of the messages shown by reference numbers 320, 325, and 330 may be transmitted in licensed spectrum (e.g., spectrum designated by a regulatory body to be reserved for organizations that have been granted a license to operate in the spectrum, spectrum without shared spectrum channel access), which may improve reliability relative to transmitting such messages in unlicensed spectrum. In some aspects, one or more of the messages shown by reference numbers 320, 325, and 330 may be transmitted in unlicensed spectrum (e.g., spectrum that does not require a license for operation, spectrum with shared spectrum channel access), which may improve versatility of transmission of such messages.

As shown by reference number 335, the first UE and at least one of the plurality of second UEs may broadcast PRSs. For example, the first UE and at least one of the plurality of second UEs may each broadcast a single PRS. As another example, the first UE and at least one of the plurality of second UEs may each broadcast multiple PRSs. The first UE and at least one of the plurality of second UEs may broadcast the PRSs in accordance with parameters for the UE positioning session, such as parameters determined by the first UE as shown by reference number 315, or parameters determined and signaled by a second UE, such as shown by reference number 330. For example, the first UE and at least one of the plurality of second UEs may broadcast the PRSs at times indicated by the parameters and/or using sequences indicated by the parameters.

In some aspects, the PRSs may be transmitted in licensed spectrum, which may improve reliability and precision relative to transmitting such messages in unlicensed spectrum. In some aspects, the PRSs may be transmitted in unlicensed spectrum (e.g., spectrum that does not require a license for operation), which may reduce costs associated with implementation. In some aspects, a UE may perform a channel access operation, such as a listen-before-talk (LBT) operation, to access unlicensed spectrum for transmission of a PRS. In some aspects, the UE may transmit a PRS without the first UE performing a channel access operation for the transmission of the PRS, which may reduce latency and conserve resources used to perform the channel access operation. The transmission of the PRSs may be referred to as a PRS stage of the UE positioning session.

As shown by reference number 340, the first UE and/or the plurality of second UEs may determine positioning information using the PRSs. For example, the first UE may determine, based at least in part on a transmission time associated with a PRS transmitted by a second UE and a time at which the PRS is received, a distance between the first UE and the second UE. In some aspects, the positioning information may indicate a location of a UE (e.g., a geographical location of the first UE, such as an absolute initial location of the UE at the pre-PRS stage), an orientation of the UE (e.g., an absolute initial orientation of the UE, such as one or more offsets relative to a reference orientation), an antenna panel identifier that indicates an antenna panel used to transmit or receive a PRS, a gain pattern for an antenna panel (e.g., left facing, right facing, front, back, etc.), one or more time stamps associated with one or more received PRSs (e.g., indicating times at which the one or more PRSs are received based at least in part on a clock of the UE), one or more signal strengths associated with the one or more received PRSs, one or more time stamps associated with one or more transmitted PRSs (e.g., indicating times at which the one or more PRSs are transmitted based at least in part on a clock of the UE), a time of departure of a transmitted PRS, a time of arrival of a received PRS, and/or the like.

As shown by reference number 345, the first UE and the plurality of second UEs may broadcast the positioning information. The determination and broadcasting of the positioning information may be referred to as a post-PRS stage of the UE positioning session. In some aspects, the positioning information may be broadcast in a message referred to herein as a post-PRS message. The post-PRS message may indicate at least part of the positioning information determined in connection with reference number 340. For example, the post-PRS message may indicate a location of a first UE (e.g., a location at a time at which a PRS is broadcasted, multiple locations corresponding to times at which multiple PRSs are broadcasted, a trajectory of the first UE while multiple PRSs are broadcasted).

In some aspects, the first UE or a second UE may broadcast a post-PRS message after all PRSs have been transmitted by the first UE and the plurality of second UEs. In some aspects, the first UE or a second UE may broadcast a post-PRS message after a group of PRSs have been transmitted by the first UE and the plurality of second UEs. For example, if the first UE and the plurality of second UEs are to transmit multiple groups of PRSs, the first UE or a second UE may broadcast a post-PRS message after each group of PRSs. Transmitting the post-PRS messages after all PRSs have been transmitted may conserve signaling resources and reduce overhead, while transmitting the post-PRS messages after each group of PRSs may provide more detailed information and may enable synchronization and ranging as the PRSs are transmitted.

In some aspects, the first UE or a second UE may select a time for broadcasting a post-PRS message. In some aspects, the first UE or a second UE may broadcast a post-PRS message in accordance with a pre-PRS message or a parameter associated with a UE positioning session. In some aspects, the first UE and the plurality of second UEs may transmit the plurality of post-PRS messages in a same order as corresponding PRS messages. For example, if the PRS messages are transmitted by a first UE, then a second UE, then a third UE, then the post-PRS messages may be transmitted by the first UE, then the second UE, then the third UE.

As shown by reference number 350, in some aspects, the first UE (or one or more second UEs) may perform a synchronization operation. For example, the first UE may synchronize a communication operation, a clock, or another function with a second UE. The first UE may perform this synchronization based at least in part on the set of parameters for the UE positioning session and based at least in part on the PRSs. For example, the first UE may determine a difference between a time at which a PRS is received and a time at which the PRS is expected to be received (e.g., based at least in part on a distance between the first UE and a transmitter of the PRS and based at least in part on a time at which the PRS is transmitted), and may synchronize with the transmitter of the PRS accordingly.

As shown by reference number 355, in some aspects, the first UE (or one or more second UEs) may determine ranging information based at least in part on the UE positioning session. For example, the first UE may determine a range relative to one or more second UEs based at least in part on respective positioning information of the first UE and the one or more second UEs. More particularly, the first UE may determine the ranging information based at least in part on a time at which a PRS was transmitted and a time at which the PRS is received. In some aspects, the first UE may determine a location of the first UE, and/or of a second UE, based at least in part on the positioning information. For example, the first UE may triangulate a location, may determine a location based at least in part on a previously known location and a trajectory, or may perform a similar operation. In some aspects, the first UE and/or one or more second UEs may communicate ranging information. For example, the first UE and/or one or more second UEs may transmit ranging information to each other (e.g., via broadcast or another form of transmission). In some aspects, the first UE and/or one or more second UEs may confirm or verify a determined range and/or location based at least in part on the ranging information shared by another UE, thereby improving accuracy of determination of ranges and/or locations.

As indicated above, FIG. 3 is provided as an example. Other examples may differ from what is described with regard to FIG. 3.

Figure 4:
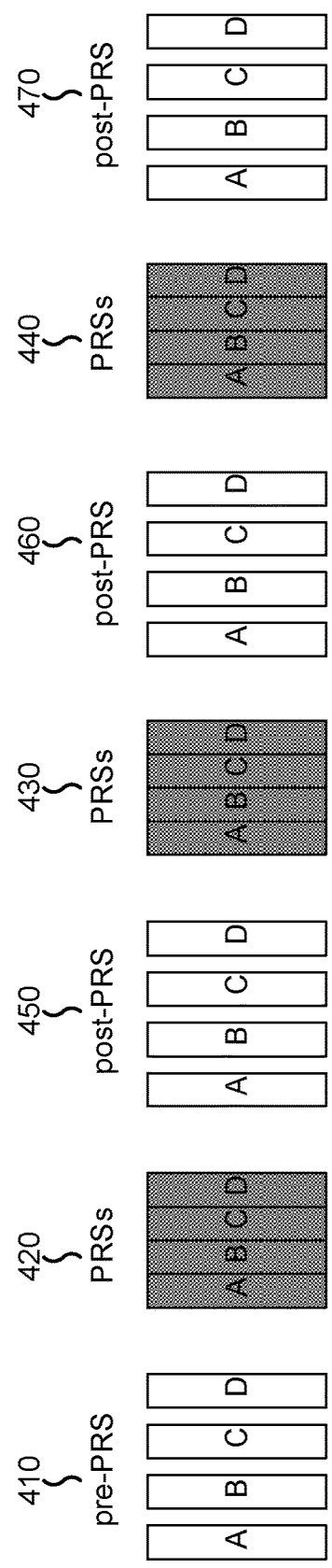
FIGS. 4 and 5 are diagrams illustrating examples of transmission times associated with pre-positioning reference signals (PRS) messages, PRS messages, and post-PRS messages, in accordance with the present disclosure.
Figure 5:
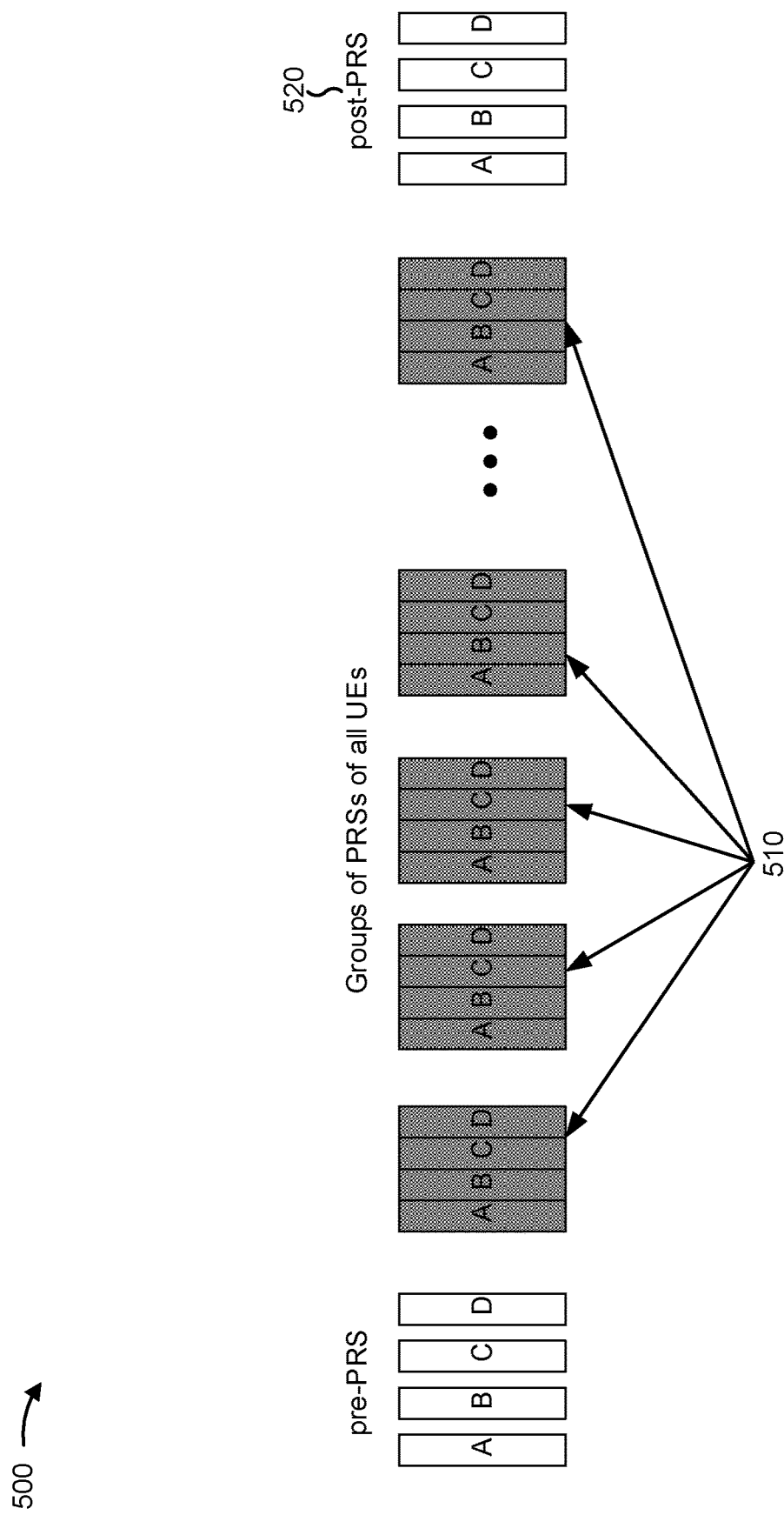

FIGS. 4 and 5 are diagrams illustrating examples 400 and 500, respectively, of transmission times associated with pre-PRS messages, PRS messages, and post-PRS messages, in accordance with the present disclosure. FIGS. 4 and 5 show examples wherein four UEs (e.g., UEs 120) perform a UE positioning session: a UE A (represented by "A"), a UE B (represented by "B"), a UE C (represented by "C"), and a UE D (represented by "D").

In example 400 of FIG. 4, the UEs A, B, C, and D perform a pre-PRS stage, shown by reference number 410, by transmitting pre-PRS messages to each other. The pre-PRS messages are shown, for example, by reference numbers 320, 325, and 330 of FIG. 3. Furthermore, the UEs A, B, C, and D transmit multiple groups of PRSs, shown by reference numbers 420, 430, and 440. In example 400, after each group of PRSs, the UEs A, B, C, and D transmit respective post-PRS messages, shown by reference number 450, 460, and 470. Thus, by performing multiple PRS stages and post-PRS stages based at least in part on a single pre-PRS stage, the UEs A, B, C, and D conserve power and communication resources.

In example 500 of FIG. 5, the UEs A, B, C, and D perform a pre-PRS stage. Subsequently, the UEs A, B, C, and D transmit multiple groups of PRSs, shown by reference number 510. A group of PRSs may also be referred to as a cycle of PRSs. After transmitting all configured groups of PRSs (e.g., in accordance with parameters indicated in the pre-PRS stage), the UEs A, B, C, and D may transmit post-PRS messages, as shown by reference number 520. Thus, the UEs A, B, C, and D may conserve power and communication resources relative to performing a pre-PRS stage and/or a post-PRS stage for each group of PRSs.

As indicated above, FIGS. 4 and 5 are provided as one or more examples. Other examples may differ from what is described with regard to FIGS. 4 and 5.

Figure 6:
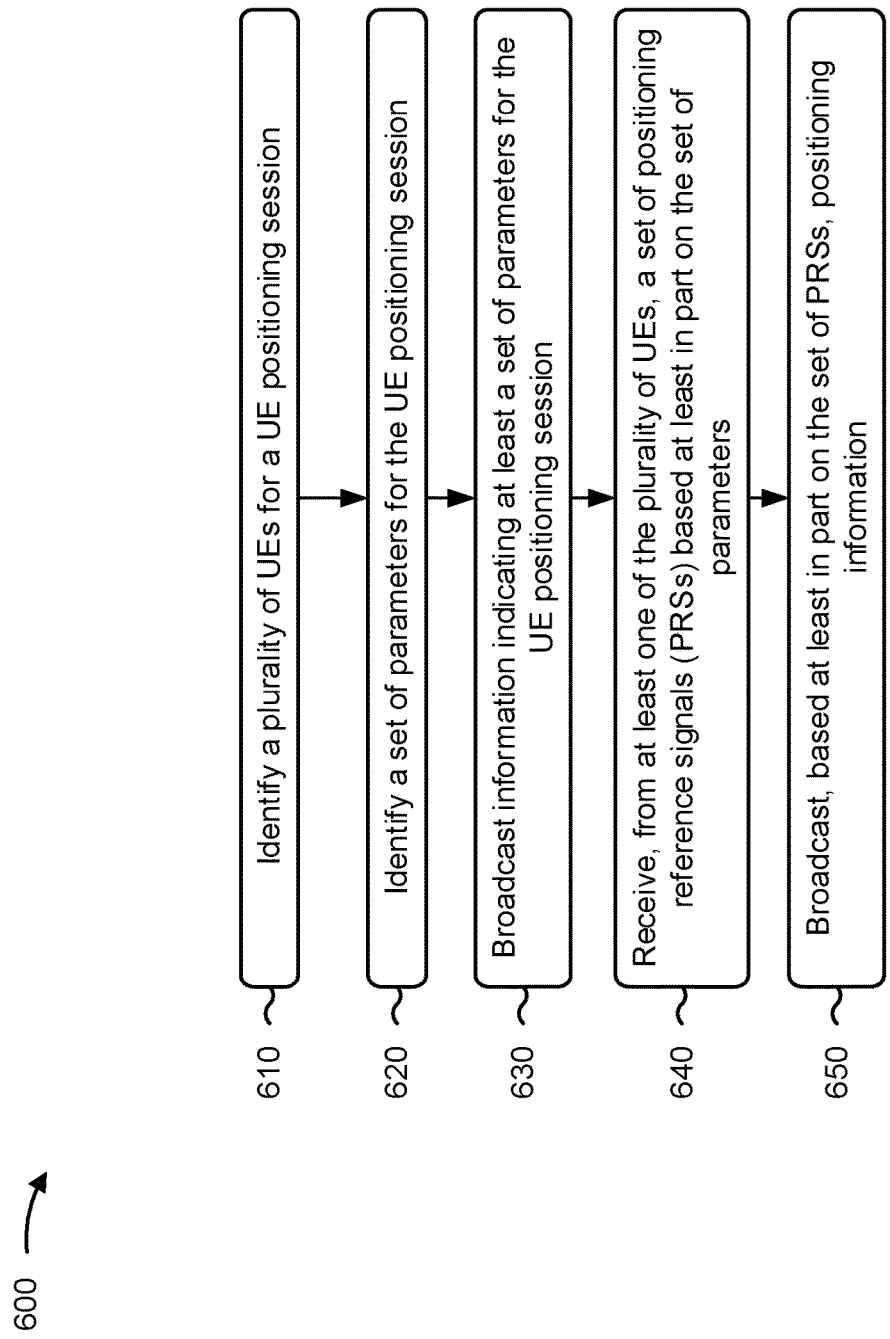
FIGS. 6-7 are diagrams illustrating example processes associated with positioning reference signaling, in accordance with the present disclosure.

FIG. 6 is a diagram illustrating an example process 600 performed, for example, by a first UE, in accordance with the present disclosure. Example process 600 is an example where the first UE (e.g., UE 120) performs operations associated with techniques for ranging and positioning of distributed devices.

As shown in FIG. 6, in some aspects, process 600 may include identifying a plurality of UEs for a UE positioning session (block 610). For example, the first UE (e.g., using identification component 808, depicted in FIG. 8) may identify a plurality of UEs for a UE positioning session, as described above.

As further shown in FIG. 6, in some aspects, process 600 may include identifying a set of parameters for the UE positioning session (block 620). For example, the first UE (e.g., using identification component 808, depicted in FIG. 8) may identify a set of parameters for the UE positioning session, as described above.

As further shown in FIG. 6, in some aspects, process 600 may include broadcasting information indicating at least the set of parameters for the UE positioning session (block 630). For example, the first UE (e.g., using transmission component 804, depicted in FIG. 8) may broadcast information indicating at least the set of parameters for the UE positioning session, as described above.

As further shown in FIG. 6, in some aspects, process 600 may include receiving, from at least one of the plurality of UEs, a set of PRSs based at least in part on the set of parameters (block 640). For example, the first UE (e.g., using reception component 802, depicted in FIG. 8) may receive, from at least one of the plurality of UEs, a set of PRSs based at least in part on the set of parameters, as described above.

As further shown in FIG. 6, in some aspects, process 600 may include broadcasting, based at least in part on the set of PRSs, positioning information (block 650). For example, the first UE (e.g., using transmission component 804, depicted in FIG. 8) may broadcast, based at least in part on the set of PRSs, positioning information, as described above.

Process 600 may include additional aspects, such as any single aspect or any combination of aspects described below and/or in connection with one or more other processes described elsewhere herein.

In a first aspect, process 600 includes receiving one or more BSMs from the plurality of UEs, wherein the identification of the plurality of UEs is based at least in part on the one or more BSMs.

In a second aspect, alone or in combination with the first aspect, process 600 includes broadcasting a PRS based at least in part on the set of parameters.

In a third aspect, alone or in combination with one or more of the first and second aspects, the set of parameters indicate a time associated with broadcasting the PRS.

In a fourth aspect, alone or in combination with one or more of the first through third aspects, the PRS and the set of PRSs are broadcast in unlicensed spectrum.

In a fifth aspect, alone or in combination with one or more of the first through fourth aspects, the PRS is broadcast without the first UE performing a listen-before-transmit operation.

In a sixth aspect, alone or in combination with one or more of the first through fifth aspects, the PRS and the set of PRSs are broadcast in licensed spectrum.

In a seventh aspect, alone or in combination with one or more of the first through sixth aspects, the set of parameters indicate a time at which the set of PRSs is to be transmitted.

In an eighth aspect, alone or in combination with one or more of the first through seventh aspects, the set of parameters indicate at least one of a PRS sequence for a PRS to be broadcast by the first UE, or one or more PRS sequences for the set of PRSs to be transmitted by the at least one of the plurality of UEs.

In a ninth aspect, alone or in combination with one or more of the first through eighth aspects, receiving the set of PRSs further comprises receiving a plurality of PRSs from a particular UE, of the plurality of UEs.

In a tenth aspect, alone or in combination with one or more of the first through ninth aspects, the positioning information is first positioning information, and the method further comprises receiving, from the particular UE, second positioning information based at least in part on a PRS transmitted by the first UE, wherein the second positioning information is received between reception of a first PRS and a second PRS of the plurality of PRSs.

In an eleventh aspect, alone or in combination with one or more of the first through tenth aspects, the second positioning information is received after each PRS of the plurality of PRSs.

In a twelfth aspect, alone or in combination with one or more of the first through eleventh aspects, the first positioning information is broadcast between the reception of the first PRS and the second PRS.

In a thirteenth aspect, alone or in combination with one or more of the first through twelfth aspects, the positioning information is first positioning information, and process 600 further comprises receiving, from the particular UE, second positioning information based at least in part on a PRS transmitted by the first UE, wherein the second positioning information is received after all PRSs of the plurality of PRSs.

In a fourteenth aspect, alone or in combination with one or more of the first through thirteenth aspects, the first positioning information is broadcast after reception of all PRSs of the plurality of PRSs.

In a fifteenth aspect, alone or in combination with one or more of the first through fourteenth aspects, process 600 includes determining a range relative to one or more UEs, of the plurality of UEs, based at least in part on the second positioning information.

In a sixteenth aspect, alone or in combination with one or more of the first through fifteenth aspects, process 600 includes performing synchronization based at least in part on the information indicating at least the set of parameters for the UE positioning session and the second positioning information.

In a seventeenth aspect, alone or in combination with one or more of the first through sixteenth aspects, the set of parameters for the UE positioning session indicate a number of cycles of the UE positioning session.

In an eighteenth aspect, alone or in combination with one or more of the first through seventeenth aspects, the set of parameters for the UE positioning session indicate a length of the UE positioning session.

In a nineteenth aspect, alone or in combination with one or more of the first through eighteenth aspects, the set of parameters indicate an order of at least one of the first UE or the plurality of UEs in the UE positioning session.

In a twentieth aspect, alone or in combination with one or more of the first through nineteenth aspects, a discontinuous reception (DRX) cycle of the first UE is deactivated during the UE positioning session.

In a twenty-first aspect, alone or in combination with one or more of the first through twentieth aspects, process 600 includes receiving, from a UE of the plurality of UEs, an acknowledgment of the information indicating at least the set of parameters for the UE positioning session.

In a twenty-second aspect, alone or in combination with one or more of the first through twenty-first aspects, process 600 includes receiving, from a UE of the plurality of UEs and based at least in part on the information indicating at least the set of parameters for the UE positioning session, information indicating a modified parameter for the UE positioning session.

In a twenty-third aspect, alone or in combination with one or more of the first through twenty-second aspects, the positioning information indicates at least one of an absolute initial location of the first UE, an absolute initial orientation of the first UE, an antenna pattern identifier of the first UE, a gain pattern of the first UE, a time stamp associated with the set of PRSs, a signal strength associated with the set of PRSs, a time stamp associated with a PRS transmitted by the first UE, a time of departure associated with the PRS transmitted by the UE, or a time of arrival associated with the set of PRSs.

In a twenty-fourth aspect, alone or in combination with one or more of the first through twenty-third aspects, process 600 includes determining a time for broadcasting the positioning information, wherein the positioning information is broadcast at the time.

In a twenty-fifth aspect, alone or in combination with one or more of the first through twenty-fourth aspects, the information indicating at least the set of parameters for the UE positioning session indicates the time.

In a twenty-sixth aspect, alone or in combination with one or more of the first through twenty-fifth aspects, the information regarding the UE positioning session and the positioning information are broadcast in licensed spectrum.

In a twenty-sixth aspect, alone or in combination with one or more of the first through twenty-fifth aspects, the set of parameters are usable, by a particular UE of the plurality of UEs, to determine positioning information associated with the particular UE based at least in part on the set of PRSs.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
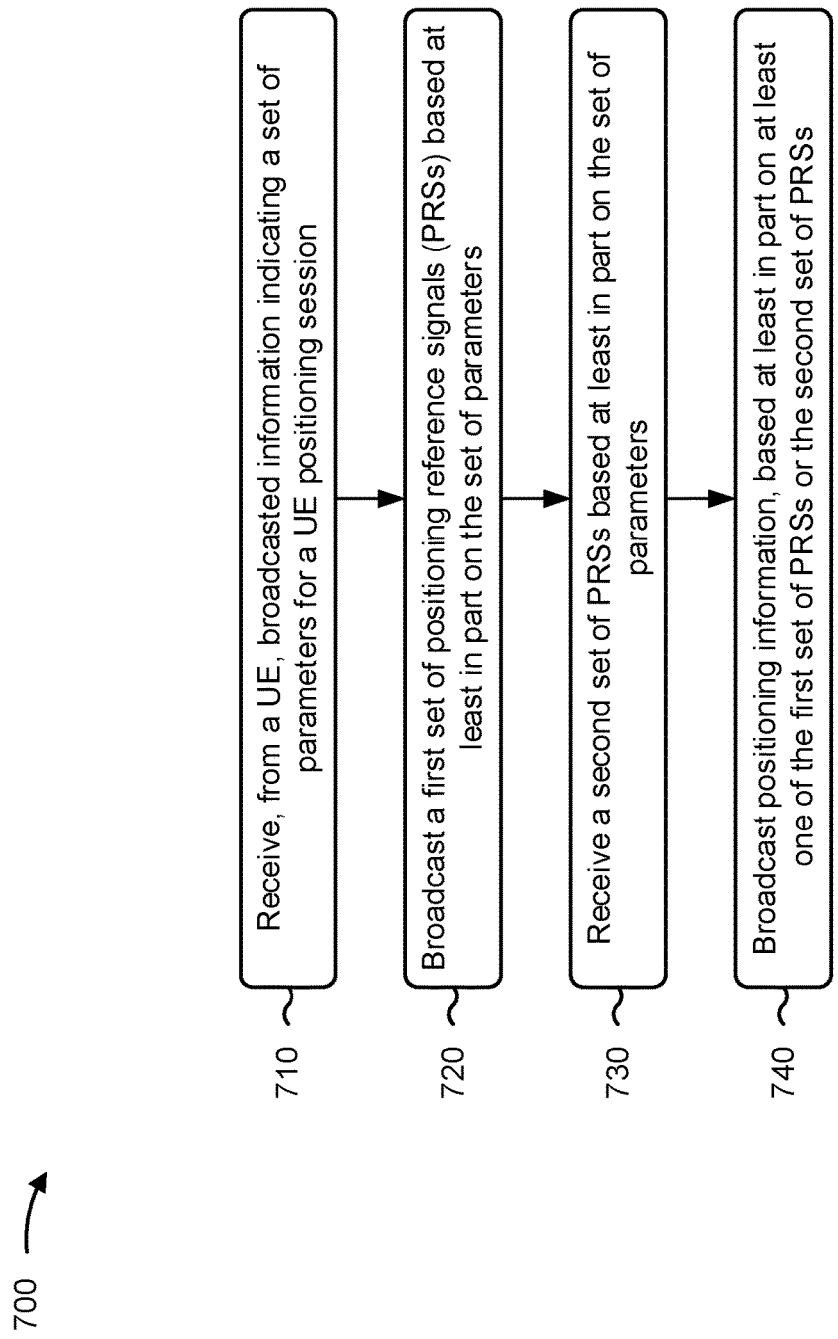

FIG. 7 is a diagram illustrating an example process 700 performed, for example, by a first UE, in accordance with the present disclosure. Example process 700 is an example where the first UE (e.g., UE 120) performs operations associated with techniques for ranging and positioning of distributed devices.

As shown in FIG. 7, in some aspects, process 700 may include receiving, from a second UE, broadcasted information indicating a set of parameters for a UE positioning session (block 710). For example, the first UE (e.g., using reception component 802, depicted in FIG. 8) may receive, from a second UE, broadcasted information indicating a set of parameters for a UE positioning session, as described above.

As further shown in FIG. 7, in some aspects, process 700 may optionally include broadcasting a first set of PRSs based at least in part on the set of parameters (block 720). For example, the first UE (e.g., using transmission component 804, depicted in FIG. 8) may broadcast a first set of PRSs based at least in part on the set of parameters, as described above.

As further shown in FIG. 7, in some aspects, process 700 may include receiving a second set of PRSs based at least in part on the set of parameters (block 730). For example, the first UE (e.g., using reception component 802, depicted in FIG. 8) may receive a second set of PRSs based at least in part on the set of parameters, as described above.

As further shown in FIG. 7, in some aspects, process 700 may include broadcasting positioning information, based at least in part on at least one of the first set of PRSs or the second set of PRSs (block 740). For example, the first UE (e.g., using transmission component 804, depicted in FIG. 8) may broadcast positioning information, based at least in part on at least one of the first set of PRSs or the second set of PRSs, as described above.

Process 700 may include additional aspects, such as any single aspect or any combination of aspects described below and/or in connection with one or more other processes described elsewhere herein.

In a first aspect, the set of parameters indicate a time associated with broadcasting the first set of PRSs.

In a second aspect, alone or in combination with the first aspect, the first set of PRSs are broadcast in unlicensed spectrum.

In a third aspect, alone or in combination with one or more of the first and second aspects, the first set of PRSs are broadcast without the first UE performing a listen-before-transmit operation.

In a fourth aspect, alone or in combination with one or more of the first through third aspects, the first set of PRSs are broadcast in licensed spectrum.

In a fifth aspect, alone or in combination with one or more of the first through fourth aspects, the set of parameters indicate a time at which the first set of PRSs are to be broadcast.

In a sixth aspect, alone or in combination with one or more of the first through fifth aspects, the set of parameters indicate one or more PRS sequences for the first set of PRSs.

In a seventh aspect, alone or in combination with one or more of the first through sixth aspects, broadcasting the first set of PRSs further comprises broadcasting a plurality of PRSs.

In an eighth aspect, alone or in combination with one or more of the first through seventh aspects, the positioning information is first positioning information, and process 700 further comprises receiving, from the second UE, second positioning information based at least in part on the plurality of PRSs, wherein the second positioning information is received between broadcasting of a first PRS and a second PRS of the plurality of PRSs.

In a ninth aspect, alone or in combination with one or more of the first through eighth aspects, the second positioning information is received after each PRS of the plurality of PRSs.

In a tenth aspect, alone or in combination with one or more of the first through ninth aspects, the first positioning information is broadcast between the broadcasting of the first PRS and the broadcasting of the second PRS.

In an eleventh aspect, alone or in combination with one or more of the first through tenth aspects, the positioning information is first positioning information, and process 700 further comprises receiving, from the second UE, second positioning information based at least in part on a PRS broadcast by the first UE, wherein the second positioning information is received after all PRSs, of the plurality of PRSs, have been broadcast.

In a twelfth aspect, alone or in combination with one or more of the first through eleventh aspects, the first positioning information is broadcast after broadcasting of all PRSs of the plurality of PRSs.

In a thirteenth aspect, alone or in combination with one or more of the first through twelfth aspects, process 700 includes determining a range relative to the second UE based at least in part on the second positioning information.

In a fourteenth aspect, alone or in combination with one or more of the first through thirteenth aspects, process 700 includes performing synchronization based at least in part on the information indicating at least the set of parameters for the UE positioning session and the second positioning information.

In a fifteenth aspect, alone or in combination with one or more of the first through fourteenth aspects, the set of parameters for the UE positioning session indicates a number of cycles of the UE positioning session.

In a sixteenth aspect, alone or in combination with one or more of the first through fifteenth aspects, the set of parameters for the UE positioning session indicate a length of the UE positioning session.

In a seventeenth aspect, alone or in combination with one or more of the first through sixteenth aspects, the set of parameters indicate an order of at least one of the first UE or the second UE in the UE positioning session.

In an eighteenth aspect, alone or in combination with one or more of the first through seventeenth aspects, a DRX cycle of the first UE is deactivated during the UE positioning session.

In a nineteenth aspect, alone or in combination with one or more of the first through eighteenth aspects, process 700 includes transmitting an acknowledgment of the information indicating at least the set of parameters for the UE positioning session.

In a twentieth aspect, alone or in combination with one or more of the first through nineteenth aspects, process 700 includes transmitting, based at least in part on the information indicating at least the set of parameters for the UE positioning session, information indicating a modified parameter for the UE positioning session.

In a twenty-first aspect, alone or in combination with one or more of the first through twentieth aspects, the positioning information indicates at least one of an absolute initial location of the first UE, an absolute initial orientation of the first UE, an antenna pattern identifier of the first UE, a gain pattern of the first UE, a time stamp associated with the second set of PRSs, a signal strength associated with the second set of PRSs, a time stamp associated with the first set of PRSs, a time of departure associated with the first set of PRSs, or a time of arrival associated with the second set of PRSs.

In a twenty-second aspect, alone or in combination with one or more of the first through twenty-first aspects, process 700 includes determining a time for broadcasting the positioning information, wherein the positioning information is broadcast at the time.

In a twenty-third aspect, alone or in combination with one or more of the first through twenty-second aspects, the information indicating at least the set of parameters for the UE positioning session indicates the time.

In a twenty-fourth aspect, alone or in combination with one or more of the first through twenty-third aspects, the information regarding the UE positioning session and the positioning information are broadcast in licensed spectrum.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
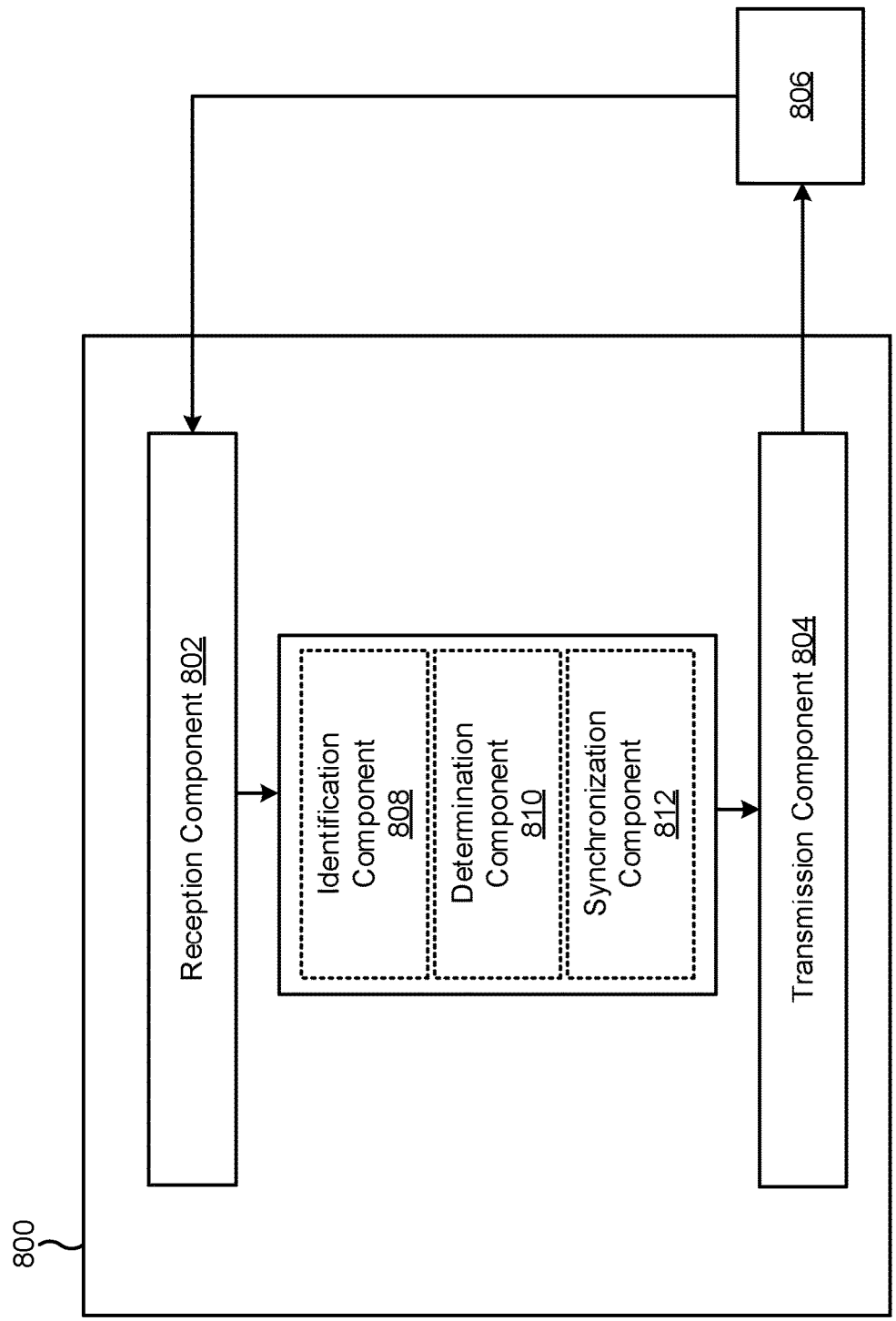
FIG. 8 is a block diagram of an example apparatus for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include an identification component 808, a determination component 810, and/or a synchronization component 812, among other examples.

In some aspects, the apparatus 800 may be configured to perform one or more operations described herein in connection with FIGS. 3-5. Additionally or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

The identification component 808 may identify a plurality of UEs for a UE positioning session. In some aspects, the identification component 808 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The identification component 808 may identify a set of parameters for the UE positioning session. In some aspects, the identification component 808 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 804 may broadcast information indicating at least the set of parameters for the UE positioning session. The reception component 802 may receive, from at least one of the plurality of UEs, a set of PRSs based at least in part on the set of parameters. The transmission component 804 may broadcast, based at least in part on the set of PRSs, positioning information.

The reception component 802 may receive one or more BSMs from the plurality of UEs, wherein the identification of the plurality of UEs is based at least in part on the one or more BSMs.

The transmission component 804 may broadcast a PRS based at least in part on the set of parameters. In some aspects, the transmission component 804 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 810 may determine a range relative to one or more UEs, of the plurality of UEs, based at least in part on the second positioning information. For example, the determination component may determine ranging information. In some aspects, the determination component 810 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The synchronization component 812 may perform synchronization based at least in part on the information indicating at least the set of parameters for the UE positioning session and the second positioning information. In some aspects, the synchronization component 812 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The reception component 802 may receive, from a UE of the plurality of UEs, an acknowledgment of the information indicating at least the set of parameters for the UE positioning session.

The reception component 802 may receive, from a UE of the plurality of UEs and based at least in part on the information indicating at least the set of parameters for the UE positioning session, information indicating a modified parameter for the UE positioning session.

The determination component 810 may determine a time for broadcasting the positioning information, wherein the positioning information is broadcast at the time. In some aspects, the determination component 810 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The reception component 802 may receive, from a UE, broadcasted information indicating a set of parameters for a UE positioning session. The transmission component 804 may broadcast a first set of PRSs based at least in part on the set of parameters. The reception component 802 may receive a second set of PRSs based at least in part on the set of parameters. The transmission component 804 may broadcast positioning information, based at least in part on at least one of the first set of PRSs or the second set of PRSs.

The determination component 810 may determine a range relative to the UE based at least in part on the second positioning information.

The synchronization component 812 may perform synchronization based at least in part on the information indicating at least the set of parameters for the UE positioning session and the second positioning information. In some aspects, the synchronization component 812 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The transmission component 804 may transmit an acknowledgment of the information indicating at least the set of parameters for the UE positioning session.

The transmission component 804 may transmit, based at least in part on the information indicating at least the set of parameters for the UE positioning session, information indicating a modified parameter for the UE positioning session.

The determination component 810 may determine a time for broadcasting the positioning information, wherein the positioning information is broadcast at the time.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a first user equipment (UE), comprising: identifying a plurality of UEs for a UE positioning session; identifying a set of parameters for the UE positioning session; broadcasting information indicating at least the set of parameters for the UE positioning session; receiving, from at least one of the plurality of UEs, a set of positioning reference signals (PRSs) based at least in part on the set of parameters; and broadcasting, based at least in part on the set of PRSs, positioning information.

Aspect 2: The method of Aspect 1, further comprising: receiving one or more basic safety messages (BSMs) from the plurality of UEs, wherein the identification of the plurality of UEs is based at least in part on the one or more BSMs.

Aspect 3: The method of any of Aspects 1-2, further comprising: broadcasting a PRS based at least in part on the set of parameters.

Aspect 4: The method of Aspect 3, wherein the set of parameters indicates a time associated with broadcasting the PRS.

Aspect 5: The method of Aspect 3, wherein the PRS and the set of PRSs are broadcast in unlicensed spectrum.

Aspect 6: The method of Aspect 5, wherein the PRS is broadcast without the first UE performing a listen-before-transmit operation.

Aspect 7: The method of Aspect 3, wherein the PRS and the set of PRSs are broadcast in licensed spectrum.

Aspect 8: The method of any of Aspects 1-7, wherein the set of parameters indicates a time at which the set of PRSs is to be transmitted.

Aspect 9: The method of any of Aspects 1-8, wherein the set of parameters indicates at least one of: a PRS sequence for a PRS to be broadcast by the first UE, or one or more PRS sequences for the set of PRSs to be transmitted by the plurality of UEs.

Aspect 10: The method of any of Aspects 1-9, wherein receiving the set of PRSs further comprises: receiving a plurality of PRSs from a particular UE, of the plurality of UEs.

Aspect 11: The method of Aspect 10, wherein the positioning information is first positioning information, and wherein the method further comprises: receiving, from the particular UE, second positioning information based at least in part on a PRS transmitted by the first UE, wherein the second positioning information is received between reception of a first PRS and a second PRS of the plurality of PRSs.

Aspect 12: The method of Aspect 11, wherein the second positioning information is received after each PRS of the plurality of PRSs.

Aspect 13: The method of Aspect 11, wherein the first positioning information is broadcast between the reception of the first PRS and the second PRS.

Aspect 14: The method of Aspect 10, wherein the positioning information is first positioning information, and wherein the method further comprises: receiving, from the particular UE, second positioning information based at least in part on a PRS transmitted by the first UE, wherein the second positioning information is received after all PRSs of the plurality of PRSs.

Aspect 15: The method of Aspect 14, wherein the first positioning information is broadcast after reception of all PRSs of the plurality of PRSs.

Aspect 16: The method of Aspect 14, further comprising: determining a range relative to one or more UEs, of the plurality of UEs, based at least in part on the second positioning information.

Aspect 17: The method of Aspect 14, further comprising: performing synchronization based at least in part on the information indicating at least the set of parameters for the UE positioning session and the second positioning information.

Aspect 18: The method of any of Aspects 1-17, wherein the set of parameters for the UE positioning session indicates a number of cycles of the UE positioning session.

Aspect 19: The method of any of Aspects 1-18, wherein the set of parameters for the UE positioning session indicates a length of the UE positioning session.

Aspect 20: The method of any of Aspects 1-19, wherein the set of parameters indicates an order of at least one of the first UE or the plurality of UEs in the UE positioning session.

Aspect 21: The method of any of Aspects 1-20, wherein a discontinuous reception (DRX) cycle of the first UE is deactivated during the UE positioning session.

Aspect 22: The method of any of Aspects 1-21, further comprising: receiving, from a UE of the plurality of UEs, an acknowledgment of the information indicating at least the set of parameters for the UE positioning session.

Aspect 23: The method of any of Aspects 1-22, further comprising: receiving, from a particular UE of the plurality of UEs and based at least in part on the information indicating at least the set of parameters for the UE positioning session, information indicating a modified parameter for the UE positioning session.

Aspect 24: The method of any of Aspects 1-23, wherein the positioning information indicates at least one of: an absolute initial location of the first UE, an absolute initial orientation of the first UE, an antenna pattern identifier of the first UE, a gain pattern of the first UE, a time stamp associated with the set of PRSs, a signal strength associated with the set of PRSs, a time stamp associated with a PRS transmitted by the first UE, a time of departure associated with the PRS transmitted by the particular UE, or a time of arrival associated with the set of PRSs.

Aspect 25: The method of any of Aspects 1-24, further comprising: determining a time for broadcasting the positioning information, wherein the positioning information is broadcast at the time.

Aspect 26: The method of Aspect 25, wherein the information indicating at least the set of parameters for the UE positioning session indicates the time.

Aspect 27: The method of any of Aspects 1-26, wherein the information regarding the UE positioning session and the positioning information are broadcast in licensed spectrum.

Aspect 28: A method of wireless communication performed by a first user equipment (UE), comprising: receiving, from a second UE, broadcasted information indicating a set of parameters for a UE positioning session; broadcasting a first set of positioning reference signals (PRSs) based at least in part on the set of parameters; receiving a second set of PRSs based at least in part on the set of parameters; and broadcasting positioning information, based at least in part on at least one of the first set of PRSs or the second set of PRSs.

Aspect 29: The method of Aspect 28, wherein the set of parameters indicates a time associated with broadcasting the first set of PRSs.

Aspect 30: The method of any of Aspects 28-29, wherein the first set of PRSs are broadcast in unlicensed spectrum.

Aspect 31: The method of Aspect 30, wherein the first set of PRSs are broadcast without the first UE performing a listen-before-transmit operation.

Aspect 32: The method of any of Aspects 28-31, wherein the first set of PRSs are broadcast in licensed spectrum.

Aspect 33: The method of any of Aspects 28-32, wherein the set of parameters indicates a time at which the first set of PRSs are to be broadcast.

Aspect 34: The method of any of Aspects 28-33, wherein the set of parameters indicates one or more PRS sequences for the first set of PRSs.

Aspect 35: The method of any of Aspects 28-34, wherein broadcasting the first set of PRSs further comprises: broadcasting a plurality of PRSs.

Aspect 36: The method of Aspect 35, wherein the positioning information is first positioning information, and wherein the method further comprises: receiving, from the second UE, second positioning information based at least in part on the plurality of PRSs, wherein the second positioning information is received between broadcasting of a first PRS and a second PRS of the plurality of PRSs.

Aspect 37: The method of Aspect 36, wherein the second positioning information is received after each PRS of the plurality of PRSs.

Aspect 38: The method of Aspect 36, wherein the first positioning information is broadcast between the broadcasting of the first PRS and the second PRS.

Aspect 39: The method of Aspect 35, wherein the positioning information is first positioning information, and wherein the method further comprises: receiving, from the second UE, second positioning information based at least in part on a PRS broadcast by the first UE, wherein the second positioning information is received after all PRSs, of the plurality of PRSs, have been broadcast.

Aspect 40: The method of Aspect 39, wherein the first positioning information is broadcast after broadcasting of all PRSs of the plurality of PRSs.

Aspect 41: The method of Aspect 39, further comprising: determining a range relative to the second UE based at least in part on the second positioning information.

Aspect 42: The method of Aspect 39, further comprising: performing synchronization based at least in part on the information indicating at least the set of parameters for the UE positioning session and the second positioning information.

Aspect 43: The method of any of Aspects 28-42, wherein the set of parameters for the UE positioning session indicates a number of cycles of the UE positioning session.

Aspect 44: The method of any of Aspects 28-43, wherein the set of parameters for the UE positioning session indicates a length of the UE positioning session.

Aspect 45: The method of any of Aspects 28-44, wherein the set of parameters indicates an order of at least one of the first UE or the second UE in the UE positioning session.

Aspect 46: The method of any of Aspects 28-45, wherein a discontinuous reception (DRX) cycle of the first UE is deactivated during the UE positioning session.

Aspect 47: The method of any of Aspects 28-46, further comprising: transmitting an acknowledgment of the information indicating at least the set of parameters for the UE positioning session.

Aspect 48: The method of any of Aspects 28-47, further comprising: transmitting, based at least in part on the information indicating at least the set of parameters for the UE positioning session, information indicating a modified parameter for the UE positioning session.

Aspect 49: The method of any of Aspects 28-48, wherein the positioning information indicates at least one of: an absolute initial location of the first UE, an absolute initial orientation of the first UE, an antenna pattern identifier of the first UE, a gain pattern of the first UE, a time stamp associated with the second set of PRSs, a signal strength associated with the second set of PRSs, a time stamp associated with the first set of PRSs, a time of departure associated with the first set of PRSs, or a time of arrival associated with the second set of PRSs.

Aspect 50: The method of any of Aspects 28-49, further comprising: determining a time for broadcasting the positioning information, wherein the positioning information is broadcast at the time.

Aspect 51: The method of Aspect 50, wherein the information indicating at least the set of parameters for the UE positioning session indicates the time.

Aspect 52: The method of any of Aspects 28-51, wherein the information regarding the UE positioning session and the positioning information are broadcast in licensed spectrum.

Aspect 53: An apparatus for wireless communication at a device, comprising a processor; memory coupled with the processor; and instructions stored in the memory and executable by the processor to cause the apparatus to perform the method of one or more of Aspects 1-52.

Aspect 54: A device for wireless communication, comprising a memory and one or more processors coupled to the memory, the one or more processors configured to perform the method of one or more of Aspects 1-52.

Aspect 55: An apparatus for wireless communication, comprising at least one means for performing the method of one or more of Aspects 1-52.

Aspect 56: A non-transitory computer-readable medium storing code for wireless communication, the code comprising instructions executable by a processor to perform the method of one or more of Aspects 1-52.

Aspect 57: A non-transitory computer-readable medium storing a set of instructions for wireless communication, the set of instructions comprising one or more instructions that, when executed by one or more processors of a device, cause the device to perform the method of one or more of Aspects 1-52.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has,"

"have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
a memory;
one or more processors, coupled to the memory, configured to:
identify a plurality of UEs for a UE positioning session;
identify a set of parameters for the UE positioning session; and
a transceiver configured to:
broadcast information indicating at least the set of parameters for the UE positioning session;
receive, from at least one of the plurality of UEs, a set of positioning reference signals (PRSs) based at least in part on the set of parameters, wherein receiving the set of PRSs includes receiving a plurality of PRSs from a particular UE of the plurality of UEs; and
broadcast, based at least in part on the set of PRSs, positioning information, wherein the transceiver is further configured to:
receive, from the particular UE, second positioning information based at least in part on a PRS transmitted by the first UE, wherein the second positioning information is received (a) between reception of a first PRS and a second PRS of the plurality of PRSs, or (b) after all PRSs of the plurality of PRSs have been transmitted.

2. The first UE of claim 1, wherein the transceiver is further configured to: receive one or more basic safety messages (BSMs) from the plurality of UEs, wherein the identification of the plurality of UEs is based at least in part on the one or more BSMs.

3. The first UE of claim 1, wherein the transceiver is further configured to: broadcast a PRS based at least in part on the set of parameters.

4. The first UE of claim 3, wherein the set of parameters indicates a time associated with broadcasting the PRS.

5. The first UE of claim 3, wherein the PRS and the set of PRSs are broadcast in unlicensed spectrum.

6. The first UE of claim 5, wherein the PRS is broadcast without the first UE performing a listen-before-transmit operation.

7. The first UE of claim 3, wherein the PRS and the set of PRSs are broadcast in licensed spectrum.

8. The first UE of claim 1, wherein the set of parameters indicates a time at which the set of PRSs is to be transmitted.

9. The first UE of claim 1, wherein the set of parameters indicates at least one of:
a PRS sequence for a PRS to be broadcast by the first UE, or
one or more PRS sequences for the set of PRSs to be transmitted by the at least one of the plurality of UEs.

10. The first UE of claim 1, wherein the second positioning information is after each PRS of the plurality of PRSs.

11. The first UE of claim 1, wherein the first positioning information is between the reception of the first PRS and the second PRS.

12. The first UE of claim 1, wherein the first positioning information is after reception of all PRSs of the plurality of PRSs.

13. The first UE of claim 1, wherein the one or more processors are further configured to:
determine a range relative to one or more UEs, of the plurality of UEs, based at least in part on the second positioning information.

14. The first UE of claim 1, wherein the one or more processors are further configured to:
perform synchronization based at least in part on the information indicating at least the set of parameters for the UE positioning session and the second positioning information.

15. The first UE of claim 1, wherein the set of parameters for the UE positioning session indicates at least one of:
a number of cycles of the UE positioning session,
a length of the UE positioning session, or
an order of at least one of the first UE or the plurality of UEs in the UE positioning session.

16. The first UE of claim 1, wherein a discontinuous reception (DRX) cycle of the first UE is deactivated during the UE positioning session.

17. The first UE of claim 1, wherein the transceiver is further configured to:
receive, from a particular UE of the plurality of UEs and based at least in part on the information indicating at least the set of parameters for the UE positioning session, information indicating a modified parameter for the UE positioning session.

18. The first UE of claim 1, wherein the set of parameters are usable, by a particular UE of the plurality of UEs, to determine positioning information associated with the particular UE based at least in part on the set of PRSs.

19. A first user equipment (UE) for wireless communication, comprising:
a memory; and
one or more processors, coupled to the memory; and
a transceiver, configured to:
receive, from a second UE, broadcasted information indicating a set of parameters for a UE positioning session;
broadcast a first set of positioning reference signals (PRSs) based at least in part on the set of parameters, wherein broadcast of the first set of PRSs includes broadcast of a plurality of PRSs;
receive a second set of PRSs based at least in part on the set of parameters; and
broadcast positioning information, based at least in part on at least one of the first set of PRSs or the second set of PRSs, wherein the transceiver is further configured to:
receive, from the second UE, second positioning information based at least in part on the plurality of PRSs, wherein the second positioning information is received between broadcasting of a first PRS and a second PRS of the plurality of PRSs.

20. The first UE of claim 19, wherein the set of parameters indicates a time associated with broadcasting the first set of PRSs or one or more PRS sequences for the first set of PRSs.

21. The first UE of claim 19, wherein the transceiver is further configured to:
transmit, based at least in part on the information indicating at least the set of parameters for the UE positioning session, information indicating a modified parameter for the UE positioning session.

22. A method of wireless communication performed by a first user equipment (UE), comprising:
receiving a plurality of messages from a plurality of UEs;
identifying a plurality of UEs for a UE positioning session based on the received plurality of messages;

identifying a set of parameters for the UE positioning session in response to identifying the plurality of UEs for the positioning session;

broadcasting information indicating at least the set of parameters for the UE positioning session;

receiving, from at least one of the plurality of UEs, a set of positioning reference signals (PRSs) based at least in part on the set of parameters; and broadcasting, based at least in part on the set of PRSs, positioning information, wherein the first UE is configured to enable other UEs of the plurality of UEs to transmit multiple PRSs in association with a single pre-PRS stage, a single post-PRS stage, or a combination thereof.

23. The method of claim 22, further comprising:

receiving one or more basic safety messages (BSMs) from the plurality of UEs, wherein the identification of the plurality of UEs is based at least in part on the one or more BSMs.

24. A method of wireless communication performed by a first user equipment (UE), comprising:

receiving, from a second UE, broadcasted information indicating a set of parameters for a UE positioning session;

broadcasting a first set of positioning reference signals (PRSs) based at least in part on the set of parameters, wherein broadcasting the first set of PRSs includes broadcasting a plurality of PRSs;

receiving a second set of PRSs based at least in part on the set of parameters;

broadcasting positioning information, based at least in part on at least one of the first set of PRSs or the second set of PRSs; and receiving, from the second UE, second positioning information based at least in part on the plurality of PRSs, wherein the second positioning information is received between broadcasting of a first PRS and a second PRS of the plurality of PRSs.

25. The method of claim 24, wherein the set of parameters indicates a time associated with broadcasting the first set of PRSs or one or more PRS sequences for the first set of PRSs.

* * * * *